United States Patent [19]

Schramm

[11] 4,058,325
[45] Nov. 15, 1977

[54] ELEVATING TRAILER

[76] Inventor: Arthur G. Schramm, 3111 E. Highland, Phoenix, Ariz. 85016

[21] Appl. No.: 682,625

[22] Filed: May 3, 1976

[51] Int. Cl.² .............................................. B62D 32/00
[52] U.S. Cl. .................................. 280/43.18; 214/506
[58] Field of Search ...................... 280/106 T, 676, 43, 280/43.11, 43.18; 214/506

[56] References Cited

U.S. PATENT DOCUMENTS

| 3,427,041 | 2/1969 | Nichols | 280/43.18 |
| 3,533,641 | 10/1970 | Driskill | 280/43.18 |
| 3,837,665 | 9/1974 | Schramm | 280/43.18 |

Primary Examiner—Philip Goodman

[57] ABSTRACT

The disclosure relates to a suspension stabilizer mens for elevatable tandem axle trailers wherein the tandem axle wheels are mounted on adjacent bell crank arms and allow the body of the trailer to be moved up and down with forward and rearward force applied to the trailer hitch. The disclosure relates to stabilizer means in the form of an equalizer lever and linkage means coupled between bell crank wheel mounting axles such as to couple the tandem wheels for unitary bell crank pivotal movement to raise and lower the trailer body by means of tension rods coupled to the trailer hitch and wherein the equalizer mechanism of the invention tends to force the wheels of one tandem axle system downwardly when another is deflected upwardly thereby equalizing or leveling the body and its load automatically as the individual wheels of the individual tandem axle systems step over bumps during the movement of the trailer along a roadway or the like.

The disclosure also relating to a wheel holding device for the aforementioned elevatable trailer for locking the wheels during elevating movement of the trailer bed from a position near the ground to a transportation or operational elevation thereof.

6 Claims, 10 Drawing Figures

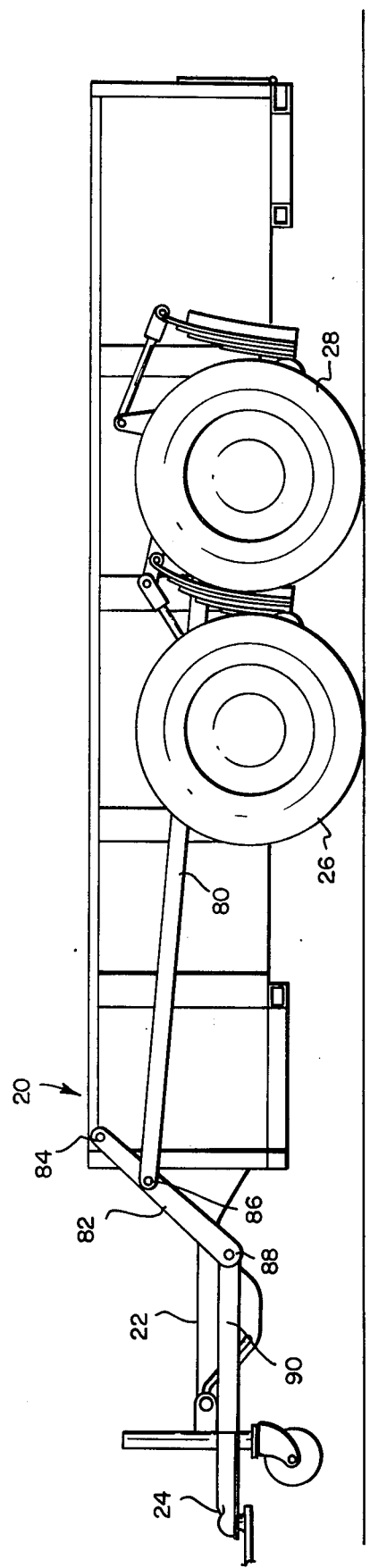
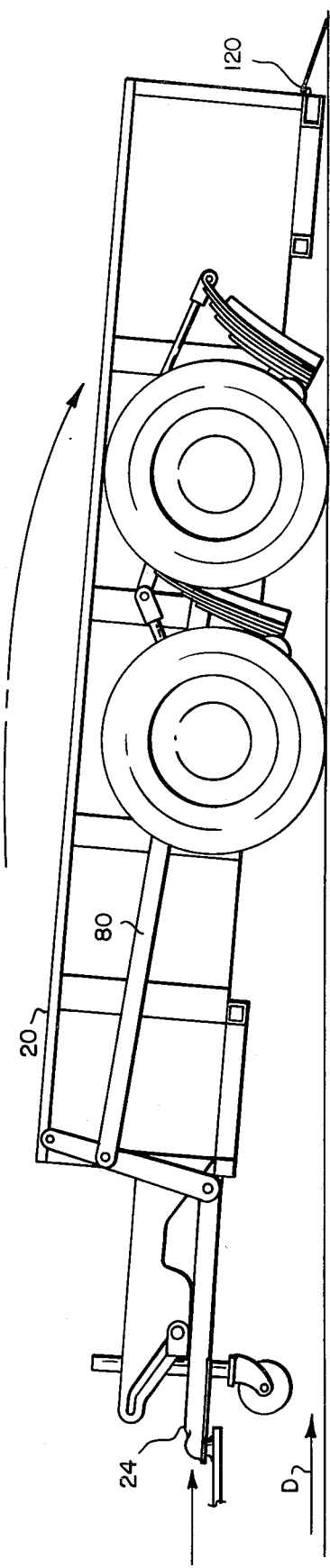

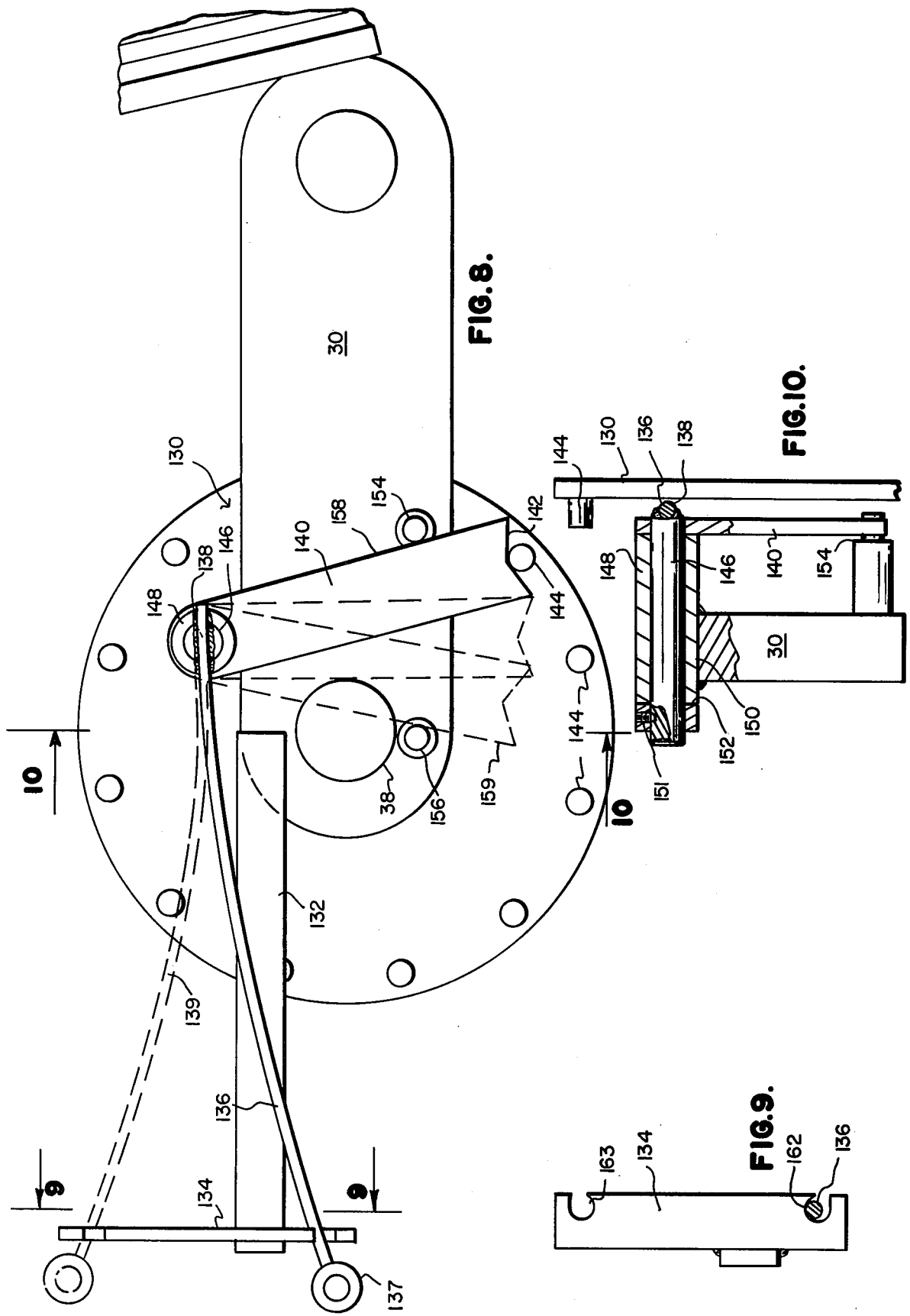

ELEVATING TRAILER

BACKGROUND OF THE INVENTION

In the prior art, tendem axle suspension systems involve elevatable trailer bodies. It has been a problem to stabilize the loaded action of the wheels of the tandem axle system, such as shown in applicant's prior U.S. Pat. No. 3,837,665.

Additionally, the cantilever leaf springs, such as disclosed in said patent, tend to flex in the opposite direction when brakes are applied and with tandem axle elevatable trailer mechanisms of this general class, the loads normally carried by such trailers require that the trailers have brakes and tork reaction of the wheels when the brakes are applied tend to flex the suspension springs in the opposite direction and apply the load to only one leaf thereof.

As aforementioned, the suspension systems of the prior art tandem axle elevatable trailer structures have had a tendency to relex suspension forces of the springing system on one axle when bumps are encountered by the other one of the tandem axles; thus, maintaining level uniform suspension of the prior art systems when operating a tendem axle trailer over bumpy roads has caused some stability problems of the suspension systems.

SUMMARY OF THE INVENTION

The present invention relates to a suspension stabilizer means for elevatable tandem axle trailers and this stabilizer means is an improvement over that disclosed in my former U.S. Pat. No. 3,837,665.

The mechanism of the present invention comprises a pair of tandem wheels on each opposite side of the trailer body and these wheels are mounted on bell crank arms having cantilever members pivotally coupled together and connected to the elevating mechanism. The pivotal coupling of the cantilever members, whether they be rigid members or springs, comprises an equalizer lever and connecting rods mounted on a seconday lever pivotally mounted on the frame and such that the connecting rods are connected to the cantilever members and to opposite ends of the equalizer member, which is pivotally mounted at its intermediate portion on a lever pivoted to the frame between the pivotal axes of the wheel supporting bell cranks so that resilient suspension reaction of one of the tandem wheels causes action of the equalizer lever to apply an opposite force to the cantilever member of the other tandem wheel and to thereby force the last mentioned wheel downwardly in response to an upward movement of the first mentioned wheel as it rides over a bump in the road. Consequently, the new stabilizer means for the elevatable trailer suspension mechanism tends to maintain the load of the trailer evenly supported and to maintain the elevation of the body of the trailer in proper position during the traverse of the trailer over bumpy roads.

The invention also comprises cantilever members in connection with the bell crank arms on which the wheels are mounted and these are cantilever members consist of multi leaf springs having backup members adapted to resist motion in the opposite direction of load carrying force applied to the springs so that tork reaction of brakes applied on the wheels will not cause undue deflection of the main leaf of each suspension spring in a backward direction. Thus, the invention relates to tandem axle trailers of an elevatable type, which employ brakes to stop heavy loads and which use cantilever springs on the bell cranks disposed to carry the load in one direction and backup members adjacent the main leaves of the springs to carry the tork reaction load when the brakes are applied and during a time when the suspension system tends to stress the springs in a direction opposite to the load carrying direction.

Additionally, the invention includes wheel holding mechanisms adapted to lock the wheels of the elevatable trailer relative to the surface of a roadway or the like so that tork reaction of the bell cranks may be forced as the trailer body is pulled forward such that the bell cranks pivot while the wheels are locked frictionally against the roadway. Thus, the trailer bed is elevated by means of pulling the trailer tongue or hitch forwardly to effect pivoting of the bell cranks on which the wheels are mounted and locked by the aforementioned locking means.

Accordingly, it is an object of the present invention to provide a novel syspension stabilizer means for elevatable tandem axle trailers.

Another object is to provide a novel means for elevatable trailers to backup conventional cantilever leaf springs connected to bell cranks on which the trailer wheels are mounted so that when the brakes are applied, the main leaves of the springs are not unduly stressed in the wrong direction as compared to the direction in which they are designed to carry a load.

Another object of the invention is to provide a wheel locking means to be used in connection with elevatable trailer wheel mechanisms; the locking means being a very simple structure which may be manually latched into or out of operative position as desired.

Another object of the invention is to provide a very simple suspension stabilizer means for elevatable tandem axle trailers which comprise equalizing linkage and lever means which tend to reverse forces of one wheel of a tandem axle system relative to the other wheel which has encountered a bump so that the load is more evenly carried due to increased tension of the suspension system of one tandem axle wheel by the engagement of the other wheel with a bump or obstruction on the roadway.

Another object is to provide a shock means in connection with a bell crank wheel support of an elevatable trailer so as to provide for brake action without unduly stressing a suspension leaf spring in the opposite direction to which it is normally loaded and deflected.

Further objects and advantages of the invention may be apparent from the following specification, appended claims and accompanying drawings.

BRIEF DESCRIPTION OF THE DRAWINGS

FIG. 1 is a side elevational view of a trailer equipped with a suspension stabilizer means for elevatable tandem axle trailers and showing the trailer in elevated position;

FIG. 2 is a view similar to FIG. 1 but showing the trailer in a lowered position substantially continguous with the ground;

FIG. 8 is an enlarged side elevational view of a wheel holding and locking mechanism for the wheels of the trailer shown in FIGS. 1 and 2 such that the wheels may be manually locked while the trailer is pulled forward to elevate it around the axes of the bell cranks on which the wheels are mounted;

FIG. 9 is a sectional view taken from the line 9—9 of FIG. 8; and

FIG. 10 is a fragmentary sectional view taken from the line 10—10 of FIG. 8.

DESCRIPTION OF THE PREFERRED EMBODIMENTS

The present invention relates to improvements over elevatable trailers shown in my issued U.S. Pat. No. 3,837,665.

Figure 3:
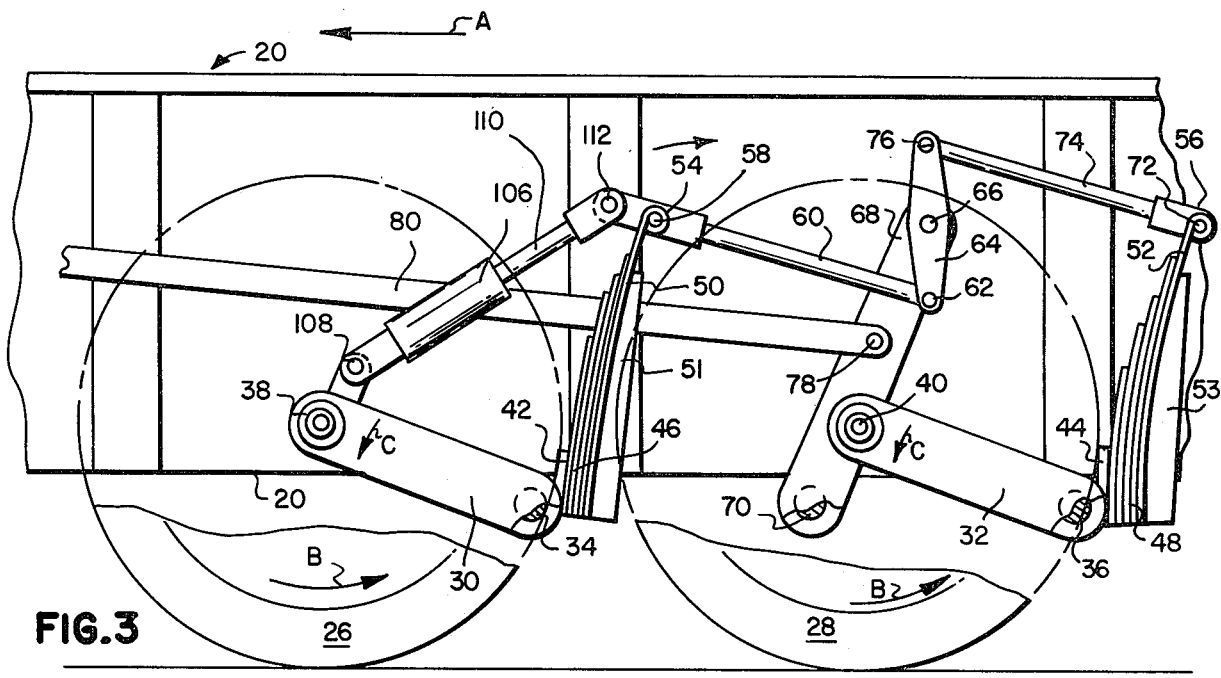
FIG. 3 is an enlarged fragmentary sectional view showing the suspension stabilizer means for elevatable tandem axle trailers of the invention and illustrating a shock means for compensating for braking forces in a reverse direction relative to the leaf springs of the mechanism.

As shown in FIG. 1 of the drawings, the improvements relate generally to tandem axle trailers in which a trailer body and frame structure designated 20 is provided with a tongue 22 and a trailer hitch 24, similar to the structures shown in the aforementioned U.S. Pat. No. 3,834,665. The frame and body 20 is supported on forward and rearward wheels 26 and 28 respectively which, as shown in FIG. 3, are mounted on tandem axle bell crank arms 30 and 32 respectively. These bell crank arms 30 and 32 are mounted on bearing shaft portions 34 and 36, which are pivotally mounted on the bottom of the frame 20 on generally horizontal axes and the axes are spaced apart longitudinally in a fore and after direction relative to the frame and body and the wheels 26 and 28 are rotatably mounted on spindles 38 and 40 respectively which are carried on the moveable ends of the bell crank arms 30 and 32.

Rigidly mounted on the bell crank arms 30 and 32, are spring mounts 42 and 44 to which springs 46 and 48 are rigidly connected. These springs 46 and 48 are multiple leaf springs having respective main leaves 50 and 52 provided with respective shackle ends 54 and 56. The shackle portion 54 of the spring leaf 50 is pivotally coupled by means of a pin 58 to a connecting rod 60 having its opposite end pivoted at 62 to an equalizer lever 64, which is provided with an intermediate pivotal mounting 66 carried by a lever 68 which is pivotally mounted on pivot bearings 70 on the bottom of the frame 20.

The shackle portion of the spring leaf 52 carries a pivot pin 72 which is pivotally connected to a connecting rod 74 and the opposite end of the connecting rod 74 is provided with a pivot pin 76 connected to an end of the equalizer lever 64 opposite to the end in which the pin 62 is pivotally mounted.

Figure 7:
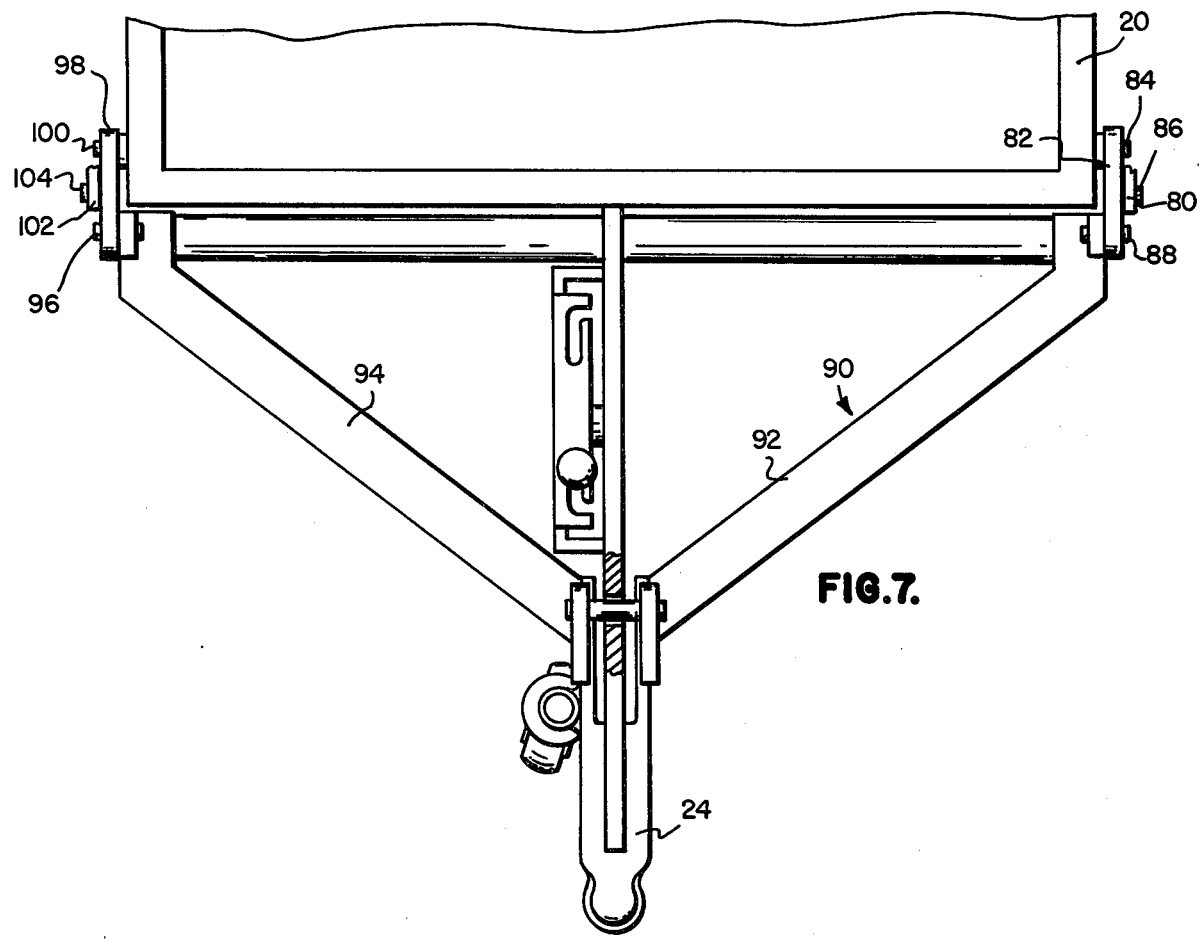
FIG. 7 is a fragmentary top or planned view of the structure shown in FIG. 6.

Connected pivotally to an intermediate portion of the lever 68 by means of a pivot bearing 78 is a tension rod 80 which is coupled, as shown in FIG. 1 of the drawings, to a lever 82 at the forward end of the trailer. This lever 82 is pivoted at 84 on the frame and body 20 and a pivot pin 86 connects the forward end of the tension rod to the lever 82 while pivot means 88 pivotally connects the respective lever 82 to the hitch member 24 at its cross bar portion 90. This cross bar portion 90, as shown in FIG. 7, is generally V-shaped and provided with a pair of diverging portions 92 and 94; the diverging portion 92 being coupled by the pin 88 with the lever 82 pivoted by means of the pin 84, as hereinbefore described, onto the body and frame 20.

The oppositely diverging portion 94 of the hitch structure 24 is pivotally coupled by means of a pivot pin 96 to a lever 98 which is pivoted by means of a pivot bearing 100 to the opposite side of the frame and body from the location of the lever 82, hereinbefore described. Connected to this lever 98 is another tension rod 102 similar to the tension rod 80, hereinbefore described, and a pivot pin 104 pivotally connecting the tension rod 102 to the lever 98.

Accordingly, it will be appreciated by those skilled in the art that the mechanism on each side of the trailer is similar to that shown in FIG. 3 and thus, a pair of the tandem axle wheels are disposed on each side of the trailer body 20.

The wheels 26 and 28 on each side of the body are provided with conventional drum or disc brakes not shown, but which provide for the stopping of the trailer during movement down a roadway or highway or the like.

When such brakes are applied and the trailer is moving in the direction of the arrow A in FIG. 3 of the drawings, tork reaction of the wheels 26 and 28 tends to cause tork reaction of the wheels in directions of the arrows B in FIG. 3 of the drawings and this tends to cause tork reaction of the bell crank arms 30 and 32 in directions of the arrows C in FIG. 3 of the drawings all of which tends to cause a reactive force rearwardly on the shackle portions 54 and 56 of the spring leaves 50 tending to separate them from the adjacent leaves of the spring. In order to resist the rearward deflection of the leaves 50 and 52 backup plates 51 and 53 respectively are contiguous with the rear sides of the leaves 50 and 52 so as to prevent a deflection set of these main leaves when a heavy load is carried by the trailer and the brakes are suddenly applied.

Additionally, a shock cylinder 106 is pivotally mounted at 108 on the bell crank arm 30 and this cylinder 106 is provided with a plunger 110 pivotally mounted at 112 on an extending portion of the connecting rod 60 so as to provide an interconnection between the bell crank arm 30 and the shackle portion 54 of the spring leaf 50. This shock cylinder 106 also provides for resistance to the separation of the main spring leaf 50 from the adjacent leaves thereof.

It will be understood by those skilled in the art that in some instances the shock cylinder 106 may be substituted for the backup spring plate 51 if desired.

Figure 4:
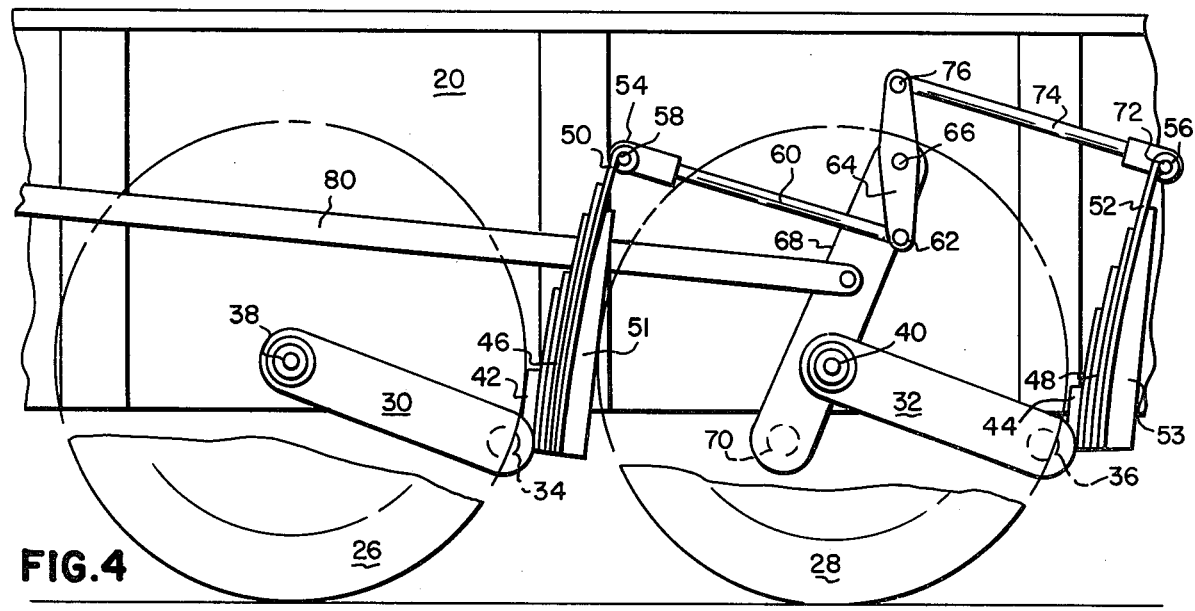
FIG. 4 is a view similar to FIG. 3 showing the shock means omitted.

In the structure, as shown in FIG. 4 of the drawings, the shock cylinder 106 is omitted and the backup plates 51 and 53 are shown only for the purpose of resisting backward deflection of the spring leaves 50 and 52, hereinbefore described.

In operation, the suspension stabilizing means of the invention, as shown in FIGS. 3 and 4 of the drawings, functions to stabilize the dynamic loading of the wheels relative to the frame and body 20 or vice versa, while the wheels are traversing bumpy roadway areas.

it will be seen that when the trailer is moving forward in the direction of the arrow A and when the wheel 26 encounters a bump, the wheel tends to react in a manner to pivot the bell crank arm 30 upwardly about the axis of its mounting bearing 34 and this causes backward force of the shackle portion 54 of the spring leaf 50 placing the connecting rod 60 in connection and tending to pivot the equalizer lever 64 in a counterclockwise direction about its pivotal mounting 66 on the lever 68. This transmits a force in a counterclockwise direction to the connecting rod 74 tending to pull forward on the shackle portion 56 of the spring 48 and to thereby pivot the bell crank arm 32 about the axis of its bearing 36 and in a direction to force the wheels 28 downwardly. Thus, as the front wheel is deflected upwardly, the rear wheel 28 is reacted downwardly to thereby stabilize the support of the load of the trailer body 20 and any cargo therein.

Figure 6:
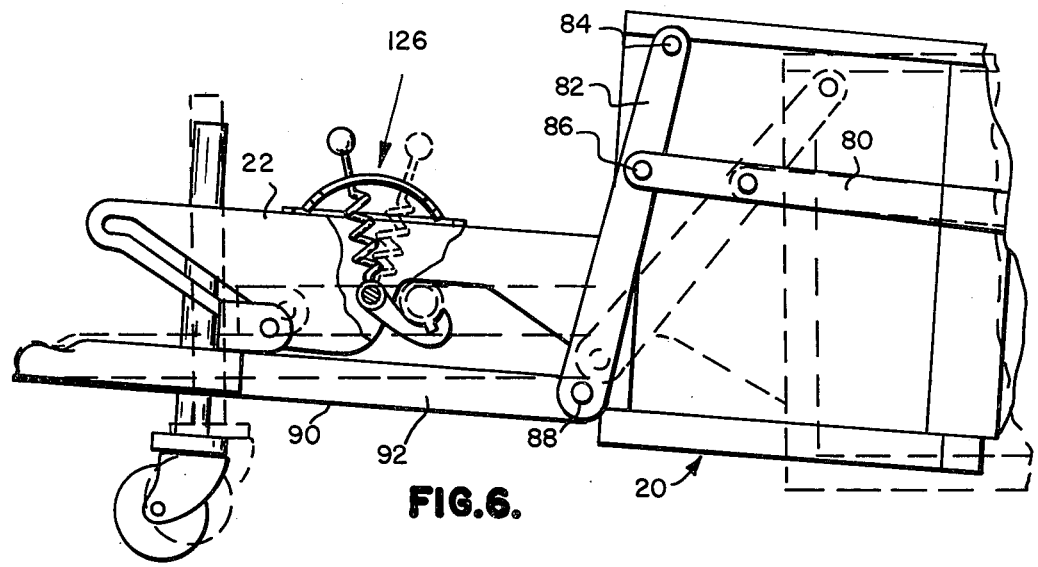
FIG. 6 is an enlarged fragmentary sectional view of the front end of the elevatable trailer mechanism on which the stabilizer means is mounted.

The tension rods 80 are latched in a forward position by the mechanism as shown in FIG. 6 of the drawings, which is similar to that shown in my issued U.S. Pat. No. 3,837,665.

Figure 5:
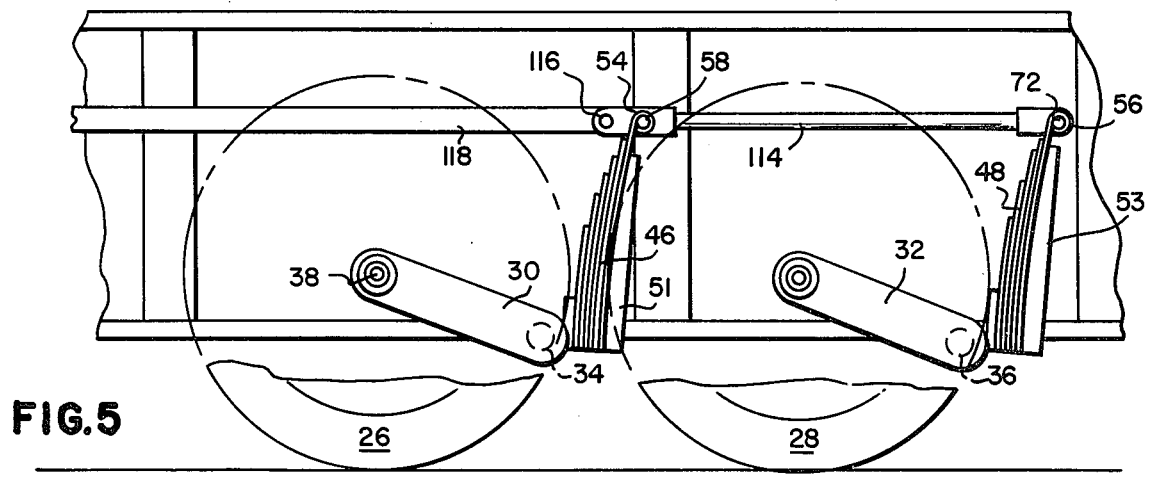
FIG. 5 is a view similar to FIGS. 3 and 4 but showing the mechanism without load stabilizer levers.

In FIG. 5 of the drawings, the shackle portions 54 and 56 are pivotally coupled by the respective pins 58 and 72 to a single connecting rod 114 which is pivotally coupled at 116 to a tension rod 118 similar to the tension rod 80 hereinbefore described.

In the modification, as shown in FIG. 5 of the drawings, it will be seen that the direct connection of the shackles 54 and 56 by the rod 114 causes both the wheels 26 and 28 to react in the same direction when a bump is encountered by either wheel. Thus, the equalizer lever 64 may be appreciated in its function, as hereinbefore described.

As disclosed in my former patent and shown in FIGS. 1 and 2 of the drawings, the trailer body is disposed to be in portable elevated position shown in FIG. 1 and pivoted downwardly so that the rear portion 120 of the body is at ground level.

This allows low level loading and heavy equipment, such as parking lot sweepers or the like, may be loaded into the body 20 whereupon a pull on the hitch 24 in a forward direction as indicated by an arrow D, the tension rods 80, together with the aforementioned lever 68 and the connecting rods 60 and 74 together with the equalizer lever 64 cause the bell crank arms 30 and 32 to pivot the wheels downwardly due to locking of the wheels by mechanism shown in FIGS. 8, 9 and 10 of the drawings.

It will be appreciated that when the wheels 26 and 28 are locked to the spindles 38 and 40, that tork reaction of the wheels frictionally engaged with the pavement or the like cause the bell crank arms 30 and 32 to pivot relative to the frame in a generally counterclockwise direction thereby elevating the trailer body and frame 20 relative to the ground from a position shown in FIG. 2 to a position shown in FIG. 1 wherein the latch mechanism disclosed in FIG. 6 and in my former patent locks the hitch relative to the tongue and thereby locks the tension rods in a forward position in connection with the levers 82 and 98 all as shown best in FIG. 1 of the drawings.

It will be seen that the hereinbefore mentioned latch means is generally indicated at 126 in FIG. 6 of the drawings so as to provide for manual release or locking positions as shown in FIGS. 2 and 1 respectively.

The means shown in FIGS. 8, 9 and 10 of the drawings comprises a disc 130 connected to each wheel hub and carried thereby about the axis of the spindle, such as the spindle 38 hereinbefore described. The respective bell crank arm 30 is provided with an extending mounting bar 132 for a latch plate 134 engageable by a resilient latch arm 136 which is connected at 138 to a latch pawl 140 which is provided with an abutment end 142 pivotal into an interferring position with an arcuate row of abutment portions 144, all as shown best in FIG. 8 of the drawings.

Each pawl member 140 is mounted on a pivot pin 146 carried by a bearing 148 mounted on an upper surface 150 of a respective one of the bell crank arms, such as the bell crank arm 30.

A retainer nut 151 on the shaft 146 operates adjacent to an end 152 of the bearing 148 to retain the pawl 140 in position.

Mounted on the bell crank arm 30 are a pair of stop pins 154 and 156 which provide for movement limits of the pawl 140 such that when the edge 158 of the pawl 140 is against the stop pin 154 and when the respective wheel 26 is tending to rotate in the direction of the arrow B, one of the abutment pins 144 engages the pawl at its end 142 and locks the disc 130, together with the wheel 26, so that the aforementioned tork reaction of the bell crank arm 30 tends to elevate the trailer body, as hereinbefore described.

In order to latch the pawl 140 in the solid line position shown in FIG. 8 of the drawings, the latch lever 136, which is a resilient member is grasped by its handle 137 and moved into a notch position as shown in FIG. 9 of the drawings, wherein the lever 136 is held captive in a notch 162 of the plate 134 and this resilient lever 136 may be moved to a broken line position as indicated at 139 wherein it is engaged with a notch 163 in the plate 134 holding the pawl in a broken line position 159 against the stop 156 as shown in FIG. 8, Thus, the pawl portion 142 is out of interference with the abutment member 144 and the disc 130 may rotate in unison with the respective wheel 26.

Accordingly, it will be appreciated that the mechanism shown in FIGS. 8, 9 and 10 will serve to lock the wheels 26 and 28 relative to the bell crank arms 30 and 32 so that a pull on the hitch 24 will actuate the tension rods 80 and move the lever 68 forward about the axis of the pins 70 and cause a downward pivotal movement of the spindles 38 and 40 and a relative upward movement of the trailer frame and body 20 so as to elevate the trailer body from the ground level position shown in FIG. 2 to the elevated transport position shown in FIG. 1; at which time the latch mechanism 126 locks the hitch 24 in forward position relative to the tongue 22.

It will obvious to those skilled in the art that various modifications may be resorted to without departing from the spirit of the invention.

I claim:

1. In an elevatable trailer; a frame having a forward end and opposite sides; a pair of bell crank arms each pivotally mounted on said frame on a horizontal axis at each opposite side of said frame; said horizontal axes of said bell crank arms being spaced apart relative to each other in a direction relative to said forward end of said frame; wheels rotatably mounted on said bell crank arms in spaced relation to said respective horizontal axes; cantilever members fixed to said bell crank arms and having end portions extending a substantial distance upwardly from said horizontal axis; connecting rods pivotally coupled to said end portions of said cantilever members; an actuating lever pivoted to said frame on each side thereof at a location between the pivotal axes of said bell crank arms; a cross bar having opposite ends pivotally coupled to said actuating levers; a tongue coupled to said cross bar and having a forward end extending beyond said forward portion of said frame; a hitch coupled to said forward end of said tongue; a tongue guide carried by said forward portion of said frame; said tongue reciprocally mounted to move to forward and rear positions relative to said tongue guide; releasable latch means disposed to lock said tongue in said forward position for holding said bell crank arms in a pivoted position wherein said frame and said horizontal axes are in elevated position; and an equalizer lever having an intermediate portion pivotally mounted on each of said actuating levers; each equalizer lever having opposite ends; and said connecting rods at each side of said frame pivotally coupled to said opposite ends of said equalizer levers.

2. The invention as defined in claim 1, wherein: intermediate levers pivotally interconnect said cross bar and said frame; tension rods pivotally interconnecting said intermediate levers and said actuating levers; each intermediate lever having one end pivotally coupled to said frame; each intermediate lever having another end pivotally coupled to said cross bar; a respective one of said tension rods pivotally coupled to a respective one of said actuating levers at a location between the ends thereof.

3. In an elevatable trailer; a frame having a forward end and opposite sides; bell crank arms pivotally mounted on said frame on horizontal axis at opposite sides of said frame; wheels rotatably mounted on said bell crank arms in spaced relation to said horizontal axis; cantilever members fixed to said bell crank arms and having shackle portions extending a substantial distance upwardly from said horizontal axis; tension rods pivotally coupled to said shackle portions; said tension rods extending towards said forward end of said frame; a cross bar having opposite ends pivotally coupled to said tension rods; a tongue coupled to said cross bar and having a forward end extending beyond said forward portion of said frame; a hitch coupled to said forward end of said tongue; a tongue guide carried by said forward portion of said frame; said tongue reciprocally mounted to move to forward and rearward positions relative to said tongue guide; and releasable latch means disposed to lock said tongue in said forward position for holding said bell crank arms in a pivoted position wherein said frame and said horizontal axis are in elevated position; a pair of said bell crank arms and a pair of said members are disposed at each of said opposite sides of said frame; a pair of second tension rods; said shackle portions of each pair of bell crank arms on each side of said frame pivotally coupled to said second tension rods.

4. In an elevatable trailer; a frame having a forward end and opposite sides; bell crank arms pivotally mounted on said frame on horizontal axis at opposite sides of said frame; wheels rotatably mounted on said bell crank arms in spaced relation to said horizontal axis; cantilever members fixed to said bell crank arms and having shackle portions extending a substantial distance upwardly from said horizontal axis; tension rods pivotally coupled to said shackle portions; said tension rods extending towards said forward end of said frame; a cross bar having opposite ends pivotally coupled to said tension rods; a tongue coupled to said cross bar and having a forward end extending beyond said forward portion of said frame; a hitch coupled to said forward end of said tongue; a tongue guide carried by said forward portion of said frame; said tongue reciprocally mounted to move to forward and rearward positions relative to said tongue guide; and releasable latch means disposed to lock said tongue in said forward position for holding said bell crank arms in a pivoted position wherein said frame and said horizontal axis are in elevated position; said cantilever members being plate springs; backup members on one side of said plate springs opposite to the direction in which said springs flex in response to load; and brakes on said wheels for stopping said trailer; said backup members being disposed to resist the tongue reaction of said bell crank arms turning to flex said springs in a direction opposite to the load bearing direction of deflection of said springs.

5. The invention as defined in claim 1, wherein: said cantilever members comprise multi leaf springs.

6. In an elevatable trailer; a frame having a forward end and opposite sides; bell crank arms pivotally mounted on said frame on horizontal axis at opposite sides of said frame; wheels rotatably mounted on said bell crank arms in spaced relation to said horizontal axis; cantilever members fixed to said bell crank arms and having shackle portions extending a substantial distance upwardly from said horizontal axis; tension rods pivotally coupled to said shackle portions; said tension rods extending towards said forward end of said frame; a cross bar having opposite ends pivotally coupled to said tension rods; a tongue coupled to said cross bar and having a forward end extending beyond said forward portion of said frame; a hitch coupled to said forward end of said tongue; a tongue guide carried by said forward portion of said frame; said tongue reciprocally mounted to move to forward and rearward positions relative to said tongue guide; and releasable latch means disposed to lock said tongue in said forward position for holding said bell crank arms in a pivoted position wherein said frame and said horizontal axis are in elevated position; a wheel holding device for each of said wheels comprising a disc member coupled to each respective wheel; said disc member having abutment members disposed in an arcuate row thereon; a pawl member pivotally mounted on a respective bell crank arm and adapted to be pivoted into interference with said abutment members; each pawl member having a stop member engageable therewith and said stop member being mounted on a respective bell crank arm; and a resilient handle on said pawl member adapted to pivot it into and out of position relative to the abutment members and a handle holding device having spaced apart retainer portions adapted to retain said resilient handle in either of two positions in which it resiliently is deflected and in which it holds the pawl member in either one of the aforementioned positions either to be out of interference with said abutment portions or in interference therewith whereby said wheels may be locked and attain frictional engagement with the surface on which they rest so that forward movement of said hitch will actuate said bell cranks and pivot them to elevate said frame of said trailer upwardly relative to the surface on which said wheels are engaged.

* * * * *